(12) United States Patent
Oka et al.

(10) Patent No.: US 7,504,987 B2
(45) Date of Patent: Mar. 17, 2009

(54) OBSTACLE DETECTING CONTROL DEVICE OF VEHICLE

(75) Inventors: Takuji Oka, Hiroshima (JP); Hiroshi Ohmura, Hiroshima (JP); Sei Kobayashi, Hiroshima (JP)

(73) Assignee: Mazda Motor Corporation (JP)

( * ) Notice: Subject to any disclaimer, the term of this patent is extended or adjusted under 35 U.S.C. 154(b) by 84 days.

(21) Appl. No.: 11/594,751

(22) Filed: Nov. 9, 2006

(65) Prior Publication Data

US 2007/0146196 A1    Jun. 28, 2007

(30) Foreign Application Priority Data

Dec. 27, 2005   (JP) .............................. 2005-374982

(51) Int. Cl.
*G01S 13/93* (2006.01)
(52) U.S. Cl. .............................. 342/70; 342/71; 342/27; 342/72; 340/435; 340/436; 340/903; 701/301
(58) Field of Classification Search ............. 342/70–72, 342/27; 340/435, 436, 903; 701/301
See application file for complete search history.

(56) References Cited

U.S. PATENT DOCUMENTS

| | | | | |
|---|---|---|---|---|
| 5,325,096 | A * | 6/1994 | Pakett | 342/70 |
| 5,517,196 | A * | 5/1996 | Pakett et al. | 342/70 |
| 6,147,637 | A * | 11/2000 | Morikawa et al. | 342/70 |
| 6,832,156 | B2 * | 12/2004 | Farmer | 701/301 |
| 6,944,544 | B1 * | 9/2005 | Prakah-Asante et al. | 701/301 |
| 7,408,448 | B2 * | 8/2008 | Li | 340/435 |
| 7,411,486 | B2 * | 8/2008 | Gern et al. | 340/438 |
| 2004/0222919 | A1 | 11/2004 | Isaji | |
| 2005/0168377 | A1 | 8/2005 | Kai | |
| 2005/0225478 | A1 | 10/2005 | Nakamura | |

FOREIGN PATENT DOCUMENTS

| | | |
|---|---|---|
| EP | 0825455 | 2/1998 |
| EP | 1031851 | 8/2000 |
| EP | 1528406 | 5/2005 |
| JP | 2000-036098 | 2/2000 |

OTHER PUBLICATIONS

European Search Report, EP 06024822, Date: Apr. 27, 2007.

* cited by examiner

*Primary Examiner*—John B Sotomayor
(74) *Attorney, Agent, or Firm*—Studebaker & Brackett PC; Donald R. Studebaker

(57) ABSTRACT

In an obstacle detecting control device installed in a vehicle body and includes a millimeter-wave radar detecting an obstacle in front of the vehicle and an operation control portion controlling a bake device and seatbelt pre-tensioner according to detection results of the obstacle by the radar, there are provided a detection frequency determining portion determining that a detection frequency of obstacle by the radar within a specified period of time exceeds a first frequency, an excessive frequency determining portion determining that a frequency of the above determination by the detection frequency determining portion exceeds a second frequency, and an indication portion and a warning buzzer to warn a passenger of a change of radar axis of the radar when the above determination by the excessive frequency determining portion is made.

8 Claims, 8 Drawing Sheets

OBSTACLE DETECTING CONTROL DEVICE OF VEHICLE

BACKGROUND OF THE INVENTION

The present invention relates to an obstacle detecting control device of a vehicle that controls an operational device of the vehicle according to detection results of an obstacle in front of the traveling vehicle by an obstacle detecting device.

Conventionally, an obstacle detecting control device of a vehicle, which includes an obstacle detecting device to detect an obstacle in front of the vehicle and an operation control device to control an operational device of the vehicle according to an obstacle state detected by the obstacle detecting device, is known.

According to the obstacle detecting control device, for example, disclosed in Japanese Patent Laid-Open Publication No. 2000-36098, a radar is attached to a vehicle body and when obstacles in front of the traveling vehicle is detected by the radar, a warning lamp is turned on and a warning sound is made. Thereby, a vehicle passenger can be warned of a risk of hitting against obstacles in front of the traveling vehicle.

However, the above-described obstacle detecting control device has a problem in that the radar would detect obstacles mistakenly. Namely, the radar is attached to the vehicle body in such a manner that a radar axis is directed toward a specified direction, and the radar detects obstacles with this radar axis as a standard in locating the detected obstacles. Accordingly, if the radar axis moved improperly for some reasons and there happened any change of the radar axis of the radar, the radar would detect obstacles mistakenly, for example, in such a manner that any obstacles, such as other traveling vehicles or guide rails, that are located obliquely forward are detected as obstacles that were located right before (in front of) the vehicle. As a result, it would cause an inappropriate situation where the warning lamp is turned on or the warning sound is made unnecessarily, thereby providing the passenger with uncomfortable feelings.

SUMMARY OF THE INVENTION

The present invention has been devised in view of the above-described problem, and an object of the present invention is to provide an obstacle detecting control device of a vehicle that can properly detect abnormality of the obstacle detecting device.

According to the present invention, there is provided an obstacle detecting control device of a vehicle, which is installed in a vehicle body and includes an obstacle detecting device to detect an obstacle in front of the vehicle and an operation control device to control an operational device of the vehicle according to detection results of the obstacle by the obstacle detecting device, the obstacle detecting control device comprising a detection frequency determining device to determine that a frequency of detection of the obstacle by the obstacle detecting device within a specified period of time exceeds a specified first frequency, an excessive frequency determining device to determine that a frequency of the above determination by the detection frequency determining device exceeds a specified second frequency, and a warning device to warn a passenger of abnormality of the obstacle detecting device when the above determination by the excessive frequency determining device is made.

Accordingly, it can be predicted whether or not the abnormality of the obstacle detecting device occurs by the detection frequency determining device determining that the frequency of detection of the obstacle by the obstacle detecting device within the specified period of time exceeds the specified first frequency. Thereby, an accidental detection of the obstacle that may not be caused by the real abnormality of the obstacle detecting device can be prevented properly, and it can be determined whether or not there exists a continuous or intermittent detection of the obstacle that may be caused by the real abnormality.

And, the excessive frequency determining device determines that the frequency of the above determination by the detection frequency determining device exceeds the specified second frequency. Namely, it is determined whether there happens the above determination more than the specified second frequency to confirm the non-accidental detection of the obstacle. When this determination more than the specified second frequency is made, it can be considered that the abnormality of the obstacle detecting device occurs, and this abnormality of the obstacle detecting device is warned to the passenger by the warning device.

As described, the determination as to whether the abnormality of the obstacle detecting device happens or not is made by checking the frequency of the detection of the obstacle. Herein, since the accidental detection of the obstacle is properly prevented by the detection frequency determining device, the abnormality of the obstacle detecting device can be determined properly by considering the detection that may be caused by the real abnormality of the obstacle detecting device. Also, since the abnormality determination is made with the plural determination (more than times of the specified second frequency), an accuracy of the determination can be improved. Further, since the abnormality determination is made based on the frequency of the detection as described above, it may not be necessary to provide any sensor additionally for the abnormality determination, thereby keeping costs down. And, since the occurrence of the abnormality of the obstacle detecting device is warmed by the warning device, the passenger can know this and even reasons of a strange situation happening, for example, where the operation control device would control the operational device too often that may be caused by this abnormality and this may provide the passenger with uncomfortable feelings. As a result, the obstacle detecting device could be fixed at need, and the uncomfortable feelings that the passenger may have can be reduced.

According to an embodiment of the present invention, the obstacle detecting device is a radar which is attached to the vehicle body in such a manner that a radar axis is directed toward a specified direction, and the abnormality of the obstacle detecting device is such that there exists a change of the radar axis of the radar.

In the above embodiment, the radar attached to the vehicle body with its radar axis being directed toward the specified direction is applied as the obstacle detecting device. In a normal state of the radar where the radar axis is directed toward the specified direction, it may not happen that the radar detects continuously other traveling vehicles traveling in an opposite traveling lane or guide rails provided beside a road as obstacles, even though it may detect them accidentally when the vehicle travels on a bumpy road. Meanwhile, in a case where the radar axis moves and there exists a change of the radar axis of the radar, the radar would detect mistakenly those other traveling vehicles or guide rails, which are located obliquely forward as obstacles that are located right in front of the vehicle, and the frequency of this detection would increase. Herein, this change of the radar axis can be properly detected by the above-described excessive frequency determining device as described above.

According to another embodiment of the present invention, there is further provided a traveling road determining device to determine whether a traveling road is an expressway or a normal road, and at least one of the above specified first frequency and specified second frequency is adjustable so that it has a greater frequency value when it is determined by the traveling road determining device that the traveling road is the normal road, compared to that when it is determined that the traveling road is the expressway.

In general, the normal road is narrower than the expressway. Thus, the distance between the traveling vehicle on the normal road and the guide rails or the vehicle traveling in the opposite traveling lane becomes shorter, so the frequency of the above accidental detection of these objects of the guide rails and the like may increase, compared to the case where the vehicle travels on the expressway. Namely, the frequency of the detection of these obstacles at the normal road traveling state becomes greater than that at the expressway traveling state, so it becomes more likely that the detection frequency determining device determines that the frequency of detection of the obstacle by the obstacle detecting device exceeds the specified first frequency and thereby there is a concern that the accuracy of the above determination would deteriorate at the normal road traveling state. Accordingly, by adjusting the above specified first frequency so as to have the greater frequency value for determination at the normal road traveling state compared to that at the expressway traveling state, namely by increasing the threshold of determination at the normal road traveling state compared to that at the expressway traveling state, the accuracy of the determination can be improved. Relatively speaking, by adjusting the above specified first frequency so as to have a smaller frequency value for determination at the expressway traveling state compared to that at the normal road traveling state, namely by decreasing the threshold of the determination at the expressway traveling state compared to that at the normal road traveling state, according to the width increase of the road, the accuracy of the determination can be improved.

Furthermore, when the road is narrower and thereby the distance of the vehicle traveling in a curved corner and the above other vehicles or guide rails becomes closer, the frequency of the determination of these objects as the real obstacles may also increase regardless of nonexistence of the above-described change of the radar axis. Thus, this non-accidental detection of the obstacle would also increase. As a result, it becomes more likely that the excessive frequency determining device determines that the frequency of the above determination by the detection frequency determining device exceeds the specified second frequency. Accordingly, by adjusting the above specified second frequency so as to have the greater frequency value for determination at the normal road traveling state compared to that at the expressway traveling state, namely by increasing the threshold of the determination at the normal road traveling state compared to that at the expressway traveling state, the accuracy of the determination can be improved. Likewise, relatively speaking, by adjusting the above specified second frequency so as to have a smaller frequency value for determination at the expressway traveling state compared to that at the normal road traveling state, namely by decreasing the threshold of determination at the expressway traveling state compared to that at the normal road traveling state, according to the width increase of the road, the accuracy of the determination can be improved.

Herein, both or either one of the specified first frequency and the specified second frequency may be adjusted as described above.

According to another embodiment of the present invention, the above frequency of the detection of the obstacle in determining the excess over the specified first frequency by the detection frequency determining device is configured to be a frequency of the detection in which the obstacle is detected within a specified detecting area of the obstacle detecting device.

Herein, the detecting area of the obstacle by the obstacle detecting device is limited to a certain area, or the above specified detecting area, so the accuracy of the detection of the change of the radar axis can be improved. Namely, in a case in which this specified detecting area is set to a particular area where the possibility that the obstacle such as the above-described other vehicles or guide rails is detected is relatively low when the radar axis is normal, while the possibility that the obstacle such as the above-described other vehicles or guide rails is detected becomes high when the radar axis moves and thereby there exists the change of the radar axis, if the obstacle is detected frequently in this particular area, there is a high likelihood that there exists the change of the radar axis. Accordingly, by limiting the detecting area properly to the area where the possibility that the obstacle is detected becomes high when there exists the change of the radar axis, the accuracy of the detection of the change of the radar axis can be improved.

According to another embodiment of the present invention, the obstacle to be detected in determining the excess over the specified first frequency by the detection frequency determining device includes an object in a stationary state and another vehicle traveling in an opposite lane, which are located in front of a traveling vehicle.

Herein, the obstacle detected by the detection frequency determining device is the object in the stationary state and another vehicle traveling in the opposite lane, which are located in front of the traveling vehicle. For example, a preceding vehicle traveling before the vehicle may be detected whether or not there exists the change of the radar axis. Meanwhile, for example, the object in the stationary state and another vehicle traveling in the opposite lane may be detected more easily as the obstacle when there exists the change of the radar axis, compared to when there exists no change of the radar axis. Namely, by setting the obstacle to be detected to the object in the stationary state and another vehicle traveling in the opposite lane, a difference in the detection frequency according to the existence of the change or no change of the radar axis comes to appear clearly. Thereby, the detection accuracy of the change of the radar axis can be improved.

According to another embodiment of the present invention, there is further provided a control prohibiting device to prohibit the control of the operational device by the operation control device when the above determination by the excessive frequency determining device is made.

Herein, when the above determination by the excessive frequency determining device is made, the control of the operational device by the operation control device is prohibited by the control prohibiting device in addition to warning the passenger of the abnormality of the obstacle detecting device by the warning device for encouraging the fixing of the obstacle detecting device. Accordingly, the operational device can be prevented from being controlled unnecessarily based on the mistaken detection of the obstacle and thereby the passenger can be also prevented from having uncomfortable feelings.

According to another embodiment of the present invention, the operational device is a brake device.

According to further another embodiment of the present invention, the operational device is a seatbelt pre-tensioner to pull in a seatbelt for restraining the passenger with a specified tension.

Herein, the brake device or the seatbelt pre-tensioner are controlled by the operation control device according to detection results of the obstacle by the obstacle detecting device. Namely, if the obstacle is detected mistakenly, unnecessary baking operation or restraint by the seatbelt may be conducted improperly, thereby providing the passenger with uncomfortable feelings. According to the above-described control device with the warning device, however, the passenger can know the reason why the control of braking device and the seatbelt pre-tensioner is conducted mistakenly (too often), so the uncomfortable feelings that the passenger may have can be reduced.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
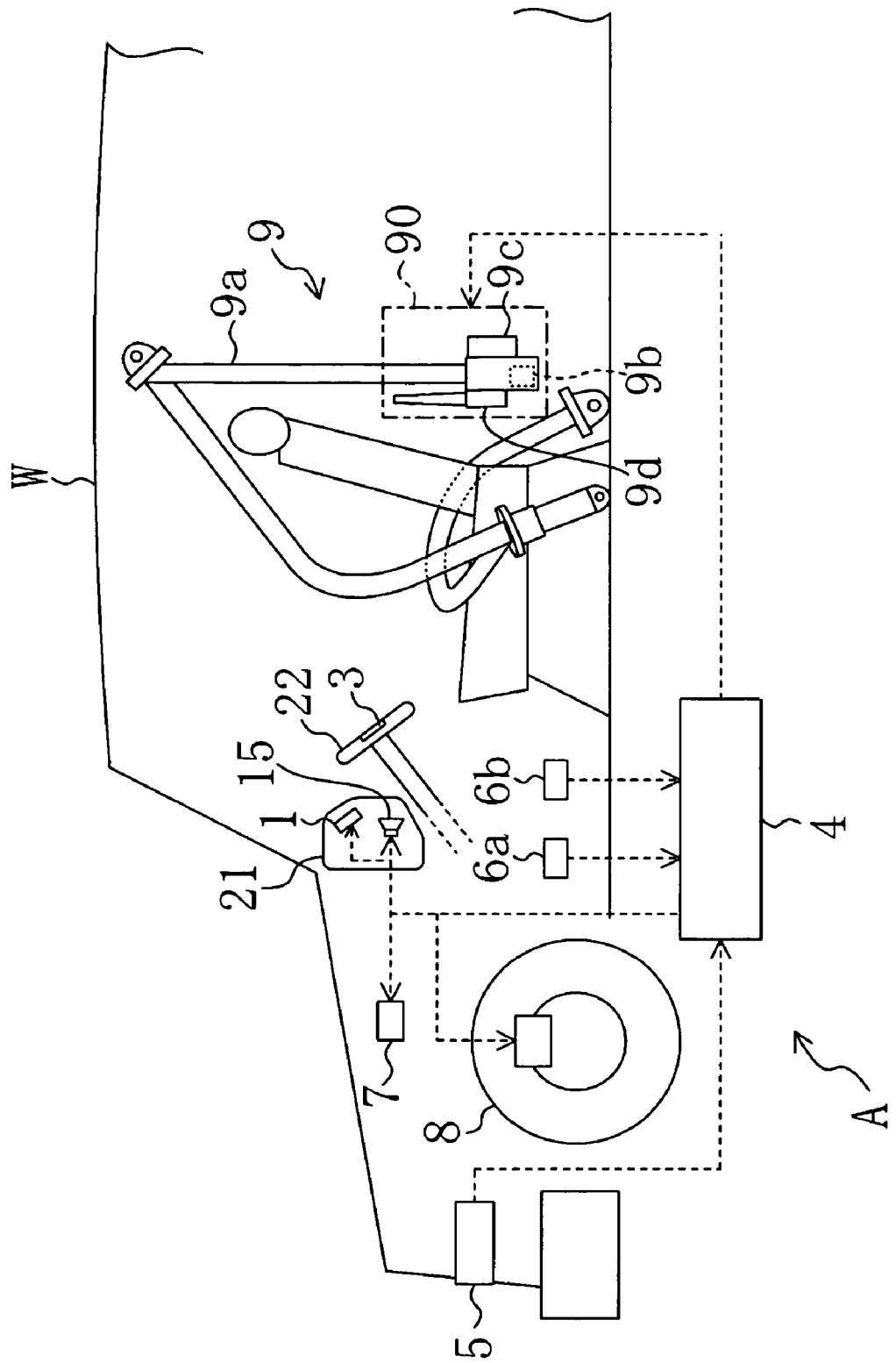
FIG. 1 is a schematic structural diagram of a vehicle equipped with an obstacle detecting control device according to an embodiment of the present invention.

FIG. 1 shows a vehicle W equipped with an obstacle detecting control device A according to an embodiment of the present invention. A meter unit 1 and a warning buzzer 15 for some warning to a passenger, which will be described in detail below, are provided at a specified portion, which is in front of a driver's seat, of an instrument panel 21 that is disposed at a front end portion in a vehicle cabin of the vehicle W. A steering wheel 22 is provided on the right side (driver's seat side) of the meter unit 1, and at this steering wheel 22 is provided an operational portion 3 to be operated by the passenger for a traveling control that will be described below.

There are also provided at the vehicle W a millimeter-wave radar 5 as an obstacle detecting device to detect an obstacle in front, which is attached to a central portion of a front end portion of the vehicle W, a vehicle speed sensor 6a to detect an actual traveling speed of the vehicle W, a crash sensor 6b to detect hitting (crash) of the vehicle W, a throttle 7 operative to control acceleration and deceleration of the vehicle W, a brake device 8 provided at vehicle wheels, and a seatbelt device 9 provided at seats.

The obstacle detecting control device A performs a traveling control for a self-traveling-control by controlling a vehicle speed of the vehicle W, and PCS (Pre-Crash Safety System) control for operating the brake device 8 and seatbelt device 9 when a vehicle hitting (crash) against an obstacle is predicted according to a detection of the obstacle in front of the traveling vehicle.

The millimeter-wave radar 5 is attached to the central portion of the front end portion of the vehicle W in such a manner that a radar axis (see a reference character L in FIG. 5) is directed toward the front of the vehicle W. This radar 5 is a scan type of millimeter-wave radar that scans a specified-angle range in front with a detecting signal and detects a location of the obstacle according to a reflection wave of signal from the obstacle. Herein, another type of radar such as a laser radar, a supersonic radar may be applied.

The seatbelt device 9 comprises a webbing 9a to restrain the passenger seated in the seat, a retractor 9b provided at a center pillar (not illustrated) that has a guide drum (not illustrated) to wind up the webbing 9a, and a seatbelt pre-tensioner 90 to add a specified tension to the webbing 9a. The retractor 9b includes a sensor (not illustrated) to detect the amount of wound-up webbing 9a. The seatbelt pre-tensioner 90 comprises a first pre-tensioner mechanism 9c and a second pre-tensioner mechanism 9d. The first pre-tensioner mechanism 9c, which is provided at the back face of the retractor 9b, adds a first tension that is greater than a normal tension to the webbing 9a by winding up, and the second pre-tensioner mechanism 9d, which is provided at the front face of the retractor 9b, adds a second tension that is greater than the first tension to the webbing 9a by winding up. The first pre-tensioner mechanism 9c comprises an electric motor (not illustrated) and withdrawal and winding up of the webbing 9a is conducted by a drive of this motor. Meanwhile, The second pre-tensioner mechanism 9d comprises an inflator (not illustrated) and the winding up of the webbing 9a is conducted by an operation of this inflator at a faster speed than that by the first pre-tensioner mechanism 9c.

Figure 2:
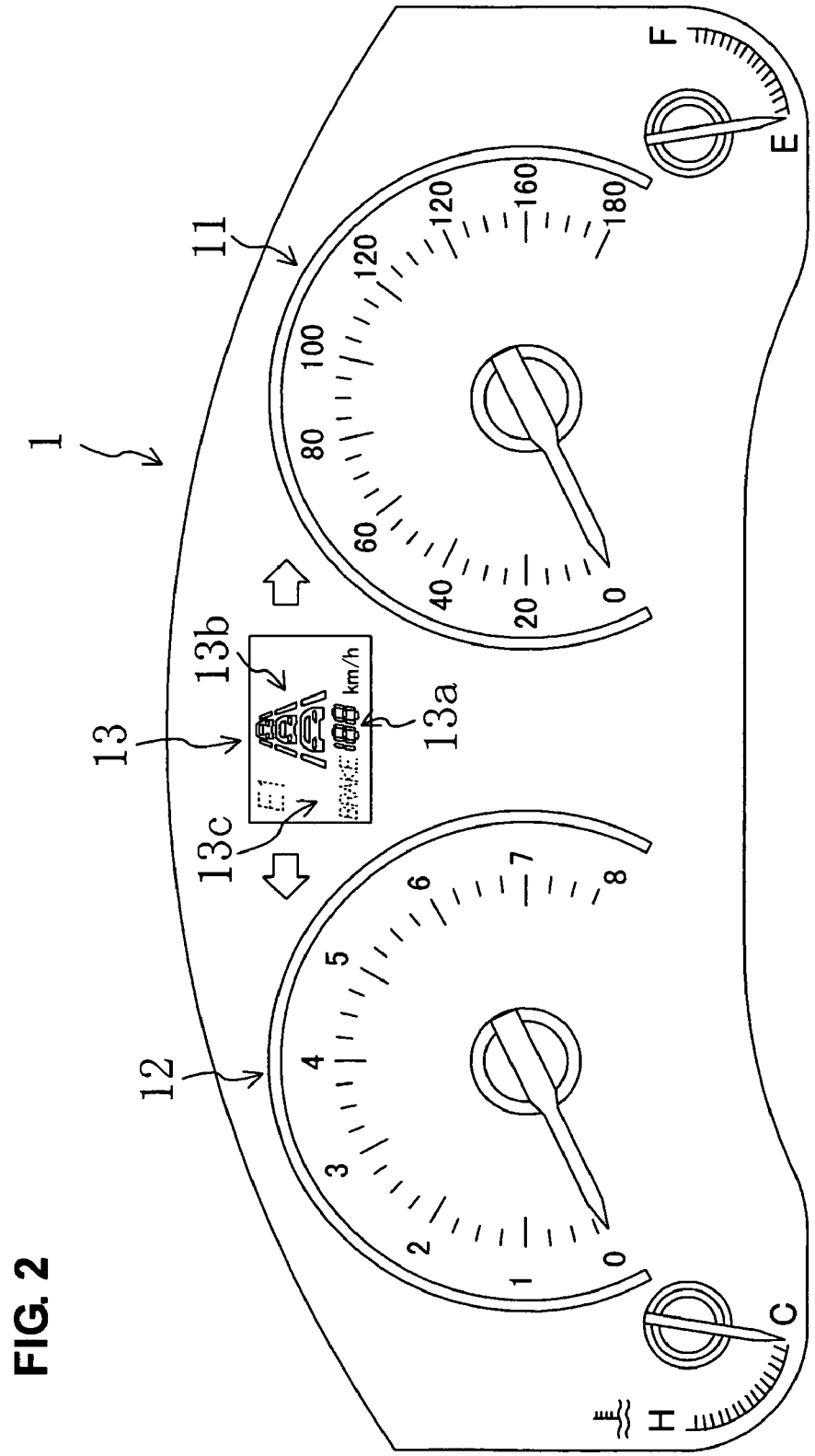
FIG. 2 is an enlarged diagram of a meter unit provided at an instrument panel of the vehicle.

The meter unit 1, as shown in FIG. 2, includes some meters, such as a speed meter 11 to indicated the actual traveling speed of the vehicle W and a rotation meter 12 to indicate an engine speed, and at an upper central portion of the meter unit 1 is provided an indication portion 13 to indicate a control state of the vehicle W.

The indication portion 13 comprises a target speed indicator 13a to indicate a target speed set by the passenger in the traveling control, which will be described in detail below, a target vehicle distance indicator 13b to indicate a target vehicle distance set by the passenger in the traveling control and a vehicle distance detected by the millimeter-wave radar 5 (with three stages, "Far" "Middle" and "Near"), and a warning area 13c for warning that is an area other than the indicators 13a, 13b. Herein, this indication portion 13 forms a warning device with the above-described warning device.

Figure 3:
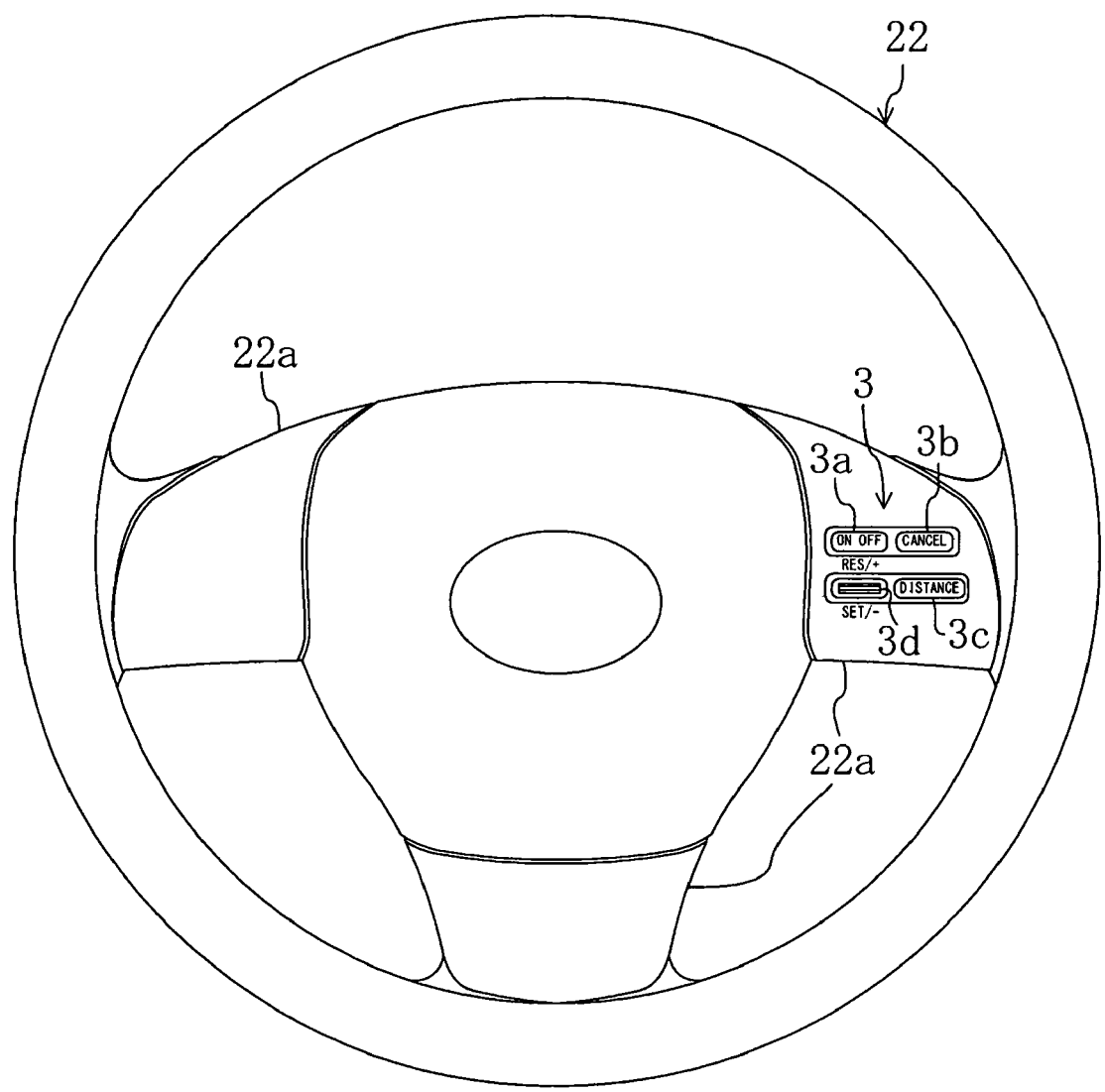
FIG. 3 is a view of a steering wheel of the vehicle.

The operational portion 3 is provided at a right-side spoke portion 22a among three spoke portions 22a that are formed at left, right and lower sides of the steering wheel 22 as shown in FIG. 3, and comprises four operational switches. A main switch to execute and stop the traveling control is provided at a left portion, a cancel switch 3b to cancel the traveling control is provided at a right portion, a target vehicle distance setting switch 3c to set the target distance between the vehicle W and a preceding vehicle in front is provided at a lower portion, and a target speed setting switch 3d to set the target traveling speed of the vehicle W is provided on the left side of the switch 3c and below the switch 3a.

The target speed setting switch 3d can be operated by falling down a lever upward (to "RES/+") or downward (to "SET/−"). When this lever is fell down downward by the passenger for the first time after the traveling control is executed with the operation of the main switch 3a, a constant-speed traveling mode (auto-cruising mode) is set, and also the actual vehicle speed detected by the speed sensor 6a at the operation is set to the target vehicle speed of the vehicle W. After this, when the lever is fell down upward once (for a certain short period time that is shorter than a specified time), the target speed is increased by a specified speed. Meanwhile, when the lever is fell down downward once (for a certain short period time that is shorter than the specified time), the target speed is decreased by a specified speed. After this, by the likewise upward or downward lever operation, the target speed is increased or decreased by the specified speed. Namely, the target speed setting switch 3d of the present embodiment has both a set switch function and a target-speed changing function. Herein, these functions may be performed by separate switches, respectively.

Also, when the above-described operation of the lever being fell down upward or downward of the target speed setting switch 3d is conducted for a relatively long period of time that exceeds the above specified time (a longer operation of the lever), the target speed is controlled so as to be increased or decreased at a certain constant rate (e.g., 2 km/h per second) after the expiration of the above specified time until the end of the operation.

Further, when the lever of the target speed setting switch 3d is fell down upward for the first time after the traveling control is executed with the operation of the main switch 3a, the constant-speed traveling mode is set likewise, and in this case, however, the vehicle speed set previously by the passenger is set to the target vehicle speed. Namely, the target speed setting switch 3d has function of a resume switch as well.

Hereinafter, the target speed setting switch 3d is referred to as "a set switch" when it functions as the set switch, it is referred to as "a target speed changing switch" when it functions as the target speed changing switch, and it is referred to as "a resume switch" when it functions as the resume switch.

In the present embodiment, in a case where there is no preceding vehicle traveling in front of the vehicle W, the constant-speed traveling mode is set by the above set switch or resume switch, and a power train control module 40 (hereinafter, referred to as PCM, see FIG. 4), which will be described below, controls the throttle 7 and brake device 8 so that the actual traveling speed detected by the speed sensor 6a becomes the target speed set by the passenger with the above set switch and target speed changing switch. Meanwhile, in a case where there is the preceding vehicle traveling in front of the vehicle W, the constant-speed traveling mode is not set but a following traveling mode to follow the preceding vehicle is set, and the throttle 7 and brake device 8 are controlled so that the vehicle distance between the vehicle W and the preceding vehicle that is detected by the millimeter-wave radar 5 becomes the target distance set by the passenger with the above target vehicle distance setting switch 3c. Namely, the obstacle detecting control device A has a function of ACC (Adaptive Cruise Control).

Figure 4:
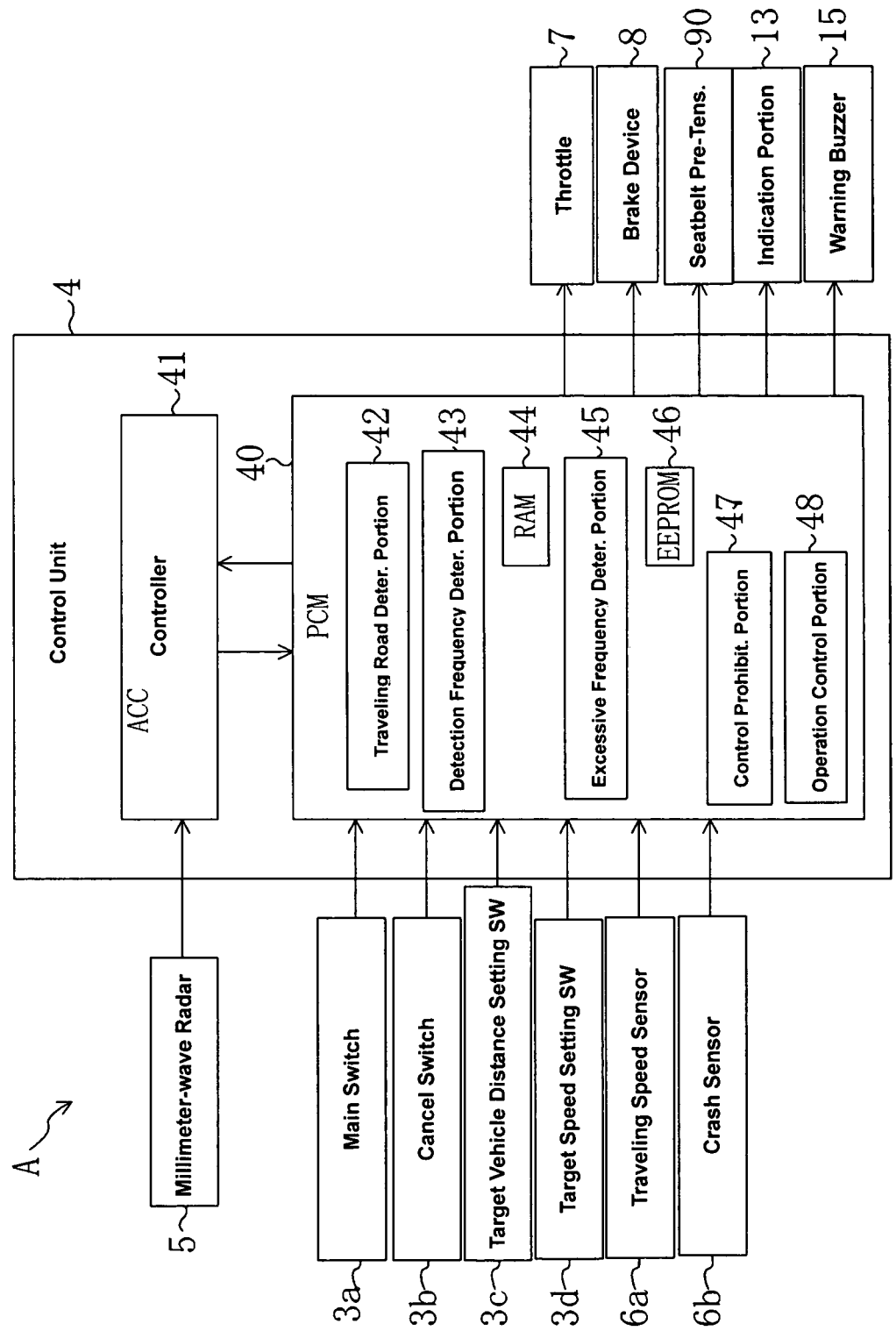
FIG. 4 is a block diagram showing a structure of the obstacle detecting control device of a vehicle.

The obstacle detecting control device A, as shown in FIG. 4, comprises a control unit 4 including the PCM 40 and an ACC controller 41 to control the above following traveling mode. The PCM 40 receives input data from the speed sensor 6a, crash sensor 6b, main switch 3a, cancel switch 3b, target vehicle distance setting switch 3c, and the target speed setting switch 3d. The ACC controller 41 receives input data from the millimeter-wave radar 5 (information on the preceding vehicle, such as the vehicle distance between the vehicle W and the preceding vehicle, a relative speed of the preceding vehicle relative to the traveling vehicle W, a traveling direction of the preceding vehicle). The PCM 40 and the ACC controller 41 exchanges the information. Information on operational switches of the main switch 3a, cancel switch 3b, target vehicle distance setting switch 3c, and the target speed setting switch 3d of the operational portion 3 are transmitted from the PCM 40 to the ACC controller 41. Information on instructions for deceleration or acceleration in the following traveling mode and information from the millimeter-wave radar 5 is transmitted from the ACC controller 41 to the PCM 40. Herein, the PCM 40 may have the following vehicle mode function of the ACC controller 41 instead.

The PCM 40 controls the throttle 7 and brake device 8 for the vehicle deceleration or acceleration and the seatbelt pre-tensioner 90 for the seatbelt operation according to the above input data information. The PCM 40 also provides the information of the target speed or vehicle distance to the indication portion 13 and the warning information to the warning buzzer 15. The indication portion 13 indicates the target speed at the indicator 13a and the target vehicle distance at the indicator 13b.

Hereinafter, the PCS control will be described. The obstacle detecting control device A detects any obstacle such as the preceding vehicle and guide rails in front of the traveling vehicle W according to the input information from the radar 5 and the speed sensor 6a and predicts the risk of the vehicle hitting against the obstacle. When the risk is high, an operation control portion 48 controls so as to warn a driver (passenger) of the high risk of the hitting with the indication portion 13 and the warning buzzer 15 and also to operate the brake device 8 and the seatbelt device 9 preliminarily.

At first, the PCM 40 detects according to output signals of the millimeter-wave radar 5 (inputted via the ACC controller 41) and the vehicle speed sensor 6a whether any obstacle exists in front of the traveling vehicle W or not, and if it does, what kind of obstacle is (for example, a moving object or a stationary object) and where it exists.

Figure 5:
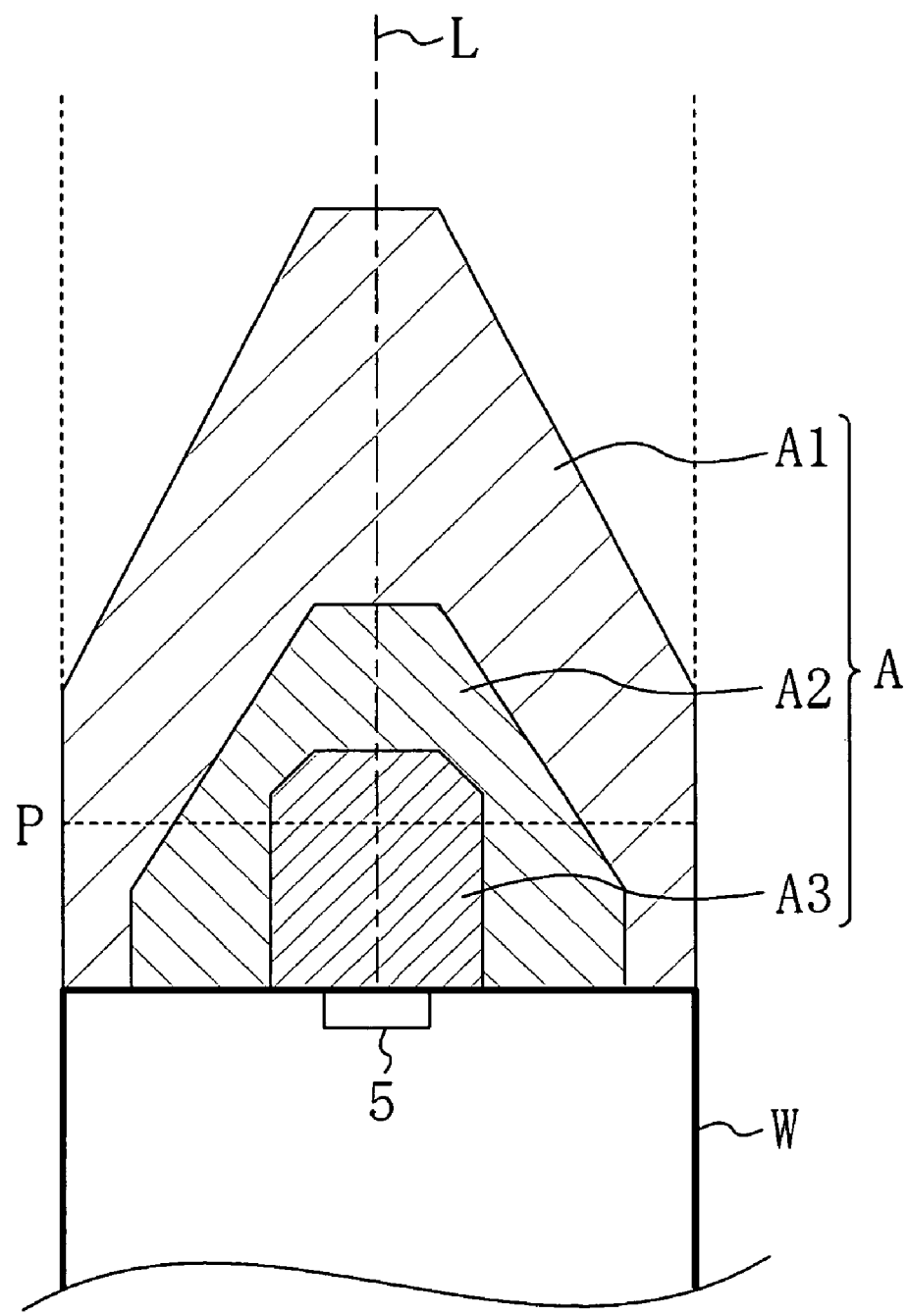
FIG. 5 is an image showing a detecting area of an obstacle.

Herein, the PCM 40 is configured to detect any obstacle that is located within a specified detecting area A in front of the traveling vehicle W shown in FIG. 5, that is a limited area from an entire detectable area by the millimeter-wave radar 5.

Specifically, both ends of the detecting area A in the vehicle width direction are limited so as to have substantially the same width as the vehicle W. This is because there is little chance that the vehicle W passes an area that is outside the above area A with the vehicle width and thereby there is little risk of the vehicle hitting against any obstacle located in this outside area. A front end of the detecting area A is limited by a distance where the vehicle W can reach in a specified time. Namely, the front end of the detecting area A is changeable according to the relative speed between the vehicle W and the preceding vehicle. The reason of the limitation of the front end of the detecting area A as described above is that the passenger may easily avoid hitting of the vehicle against any obstacle located in this far area from the vehicle W where it takes some time for the vehicle to reach. Further, front corners at both sides of the detecting area A are cut off so that the front has a pointed shape. The reason for this is the same as above and the hitting of the vehicle against any obstacle in this corner area may be relatively easily avoided. Thus, although the millimeter-wave radar 5 can detect the obstacle in a larger area where its signal reaches, the detecting area A is limited as described above by the PCM 40. Accordingly, any unnecessary warning due to over sensitive detection is prevented.

The above detecting area A is divided into three areas A1-A3 according to the distance from the center of the top end of the vehicle W, or the risk of the hitting.

More specifically, the first area A1 that is the farthest from the vehicle W (the lowest risk of the hitting) is warning area. In case of detecting any obstacle in this area A1, the operation control portion 48 operates the warning buzzer 15 to make buzzer sounds (for example, intermittent beeps), thereby warning the passenger of the detection of some obstacle exiting with the hitting risk.

The second area A2 that is closer to the vehicle W than the first area A1 (the middle risk of the hitting) is a first brake area. When any obstacle is detected in this area A2, the operation control portion 48 operates the brake device 8 to provide a specified deceleration intermittently. The passenger can recognize the risk of the hitting against the obstacle in front of the traveling vehicle W by feeling this vehicle deceleration. Herein, the target distance indicator 13b are indicated with flashing, and the warning area 13c also indicates a high risk sign (for example, "BREAK") with flashing. In addition, the warning buzzer 15 makes buzzer sounds to warn a high risk of the hitting (for example, continuous beeps). Thus, the passenger is warned of the high risk of hitting with bodily feeling, visually and aurally.

The third area A3 that is the closest to the vehicle W (the highest risk of the hitting) is a second brake area. When any obstacle is detected in this area A3, the operation control portion 48 operates the brake device 8 to provide a greater deceleration than the above specified one to avoid the hitting against the obstacle. Herein, manners of the indication of the indication portion 13 and the warning by the warning buzzer 15 are the same as those for the second area A2. Thus, the hitting against the obstacle is tried to avoid, and even in a case of hitting, the impact from the hitting may be reduced.

Further, the operation control portion 48 operates the seatbelt device 9 to have the passenger feel the warning and reduce the impact from hitting.

Specifically, the obstacle is detected in an area where the time to the hitting is shorter than a specified time, for example, a closer area than a point P in FIG. 5, the operation control portion 48 operates the first pre-tensioner 9c of the seatbelt device 9 to wind up the webbing 9a to some extent, so that the seatbelt can gain the first tension that may not prevent the passenger from operating the vehicle properly for hitting avoidance. Thereby, the passenger is restrained preliminarily for the hitting. In case that the hitting of the vehicle W is detected by the crash sensor 6b, the operation control portion 48 operates the second pre-tensioner 9d of the seatbelt device 9 to wind up the webbing 9a to some degree, so that the seatbelt can gain the second tension. Thereby, the impact that the passenger receives can be reduced.

As described above, the PCS control conducts the warning with bodily feeling and operates preliminarily safety devices such as the brake device 8 and seatbelt device 9 for reducing the hitting impact in case of the high-risk hitting against the obstacle. And, at the vehicle crash, the seatbelt device 9 is operated at the same time to reduce the impact.

Thus, the PCS performs as a very effective system for the safety. Meanwhile, if the above warning with the bodily feeling is conducted improperly often, the passenger may have uncomfortable feelings. For example, in case that there exists the change of the radar axis of the millimeter-wave radar 5, any obstacles located obliquely forward may be detected as the obstacle located right before the vehicle improperly. As a result, those obstacles, such as the guide rails or other vehicles, are considered as the obstacle with the high risk of hitting, so the control of brake device 8 and seatbelt device 9 would be operated for those obstacle to provide the warning with the bodily feeling. Herein, the vehicle W may sometimes travels near the guide rails or proceeds along other vehicles in the next lane side by side. Accordingly, if there exists the change of the radar axis of the radar 5 as described above, the unnecessary warning would be conducted repeatedly, which provides the passenger uncomfortable feelings.

According to the present embodiment, however, the PCM 40 can detect the change of the radar axis of the millimeter-wave radar 5, and when it is detected that there exists the change of the radar axis, it can warn the passenger of that and stop the warning with the bodily feeling.

Specifically, the PCM 40 further comprises a traveling road determining portion 42 to determine whether the traveling road of the vehicle W is a normal road or an expressway, a detection frequency determining portion 43 to determine whether the frequency of detection of the obstacle by the millimeter-wave radar 5 within a specified period of time exceeds a specified first frequency or not, an excessive frequency determining portion 45 to determine whether a frequency (hereinafter, referred to as en excessive frequency) of the above determination by the detection frequency determining portion 43 exceeds a specified second frequency or not, and a control prohibiting portion 47 to prohibit the control by the above-described operation control portion 48 for the warning with the bodily feeling with the brake device 8 and seatbelt device 9 when the above-described excessive frequency exceeds the specified second frequency.

Figure 6:
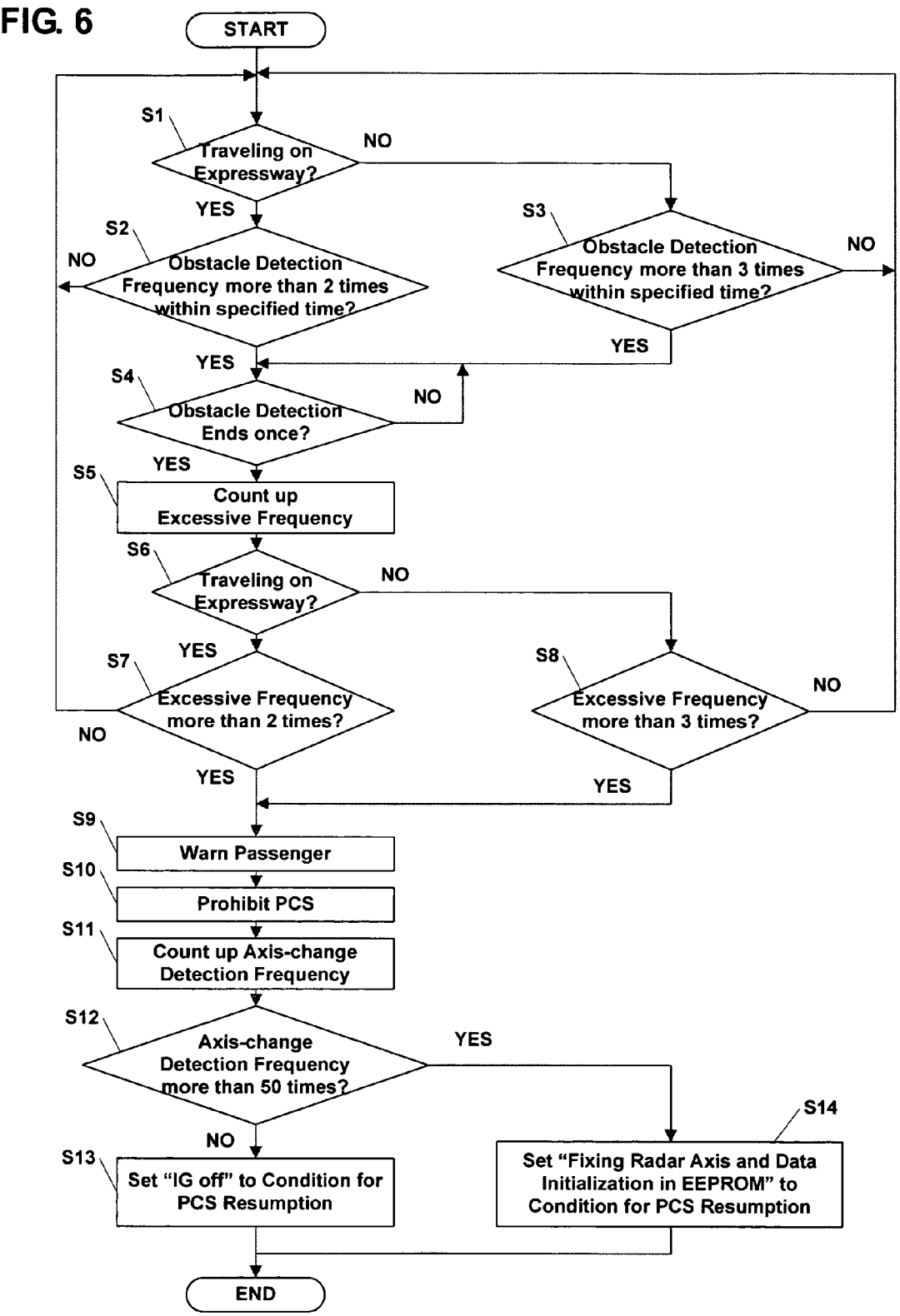
FIG. 6 is a flowchart showing an axis-change detection.

Hereinafter, the detection of the radar axis change of the millimeter-wave radar 5 by the PCM 40 will be described with a flowchart of FIG. 6.

In step S1, it is determined by the traveling road determining portion 42 whether the traveling road of the vehicle W is the normal road or the expressway. Herein, for example, when the vehicle speed detected by the speed sensor 6a is 80 km/h or higher, it is determined that the vehicle W travels on the expressway. When the vehicle speed is less than 80 km/h, it is determined that the vehicle W travels on the normal road.

Then, when the vehicle W travels on the expressway, it is determined whether the frequency of detection of the obstacle by the millimeter-wave radar 5 within the specified period of time (for example, 12 seconds) exceeds a specified first frequency for expressway (for example, 2 times) or not (step S2). Meanwhile, when the vehicle W travels on the normal road, it is determined whether the frequency of detection of the obstacle by the millimeter-wave radar 5 within the specified period of time (for example, 12 seconds) exceeds a specified first frequency for normal road (for example, 3 times) or not (step S3).

Figure 7A:
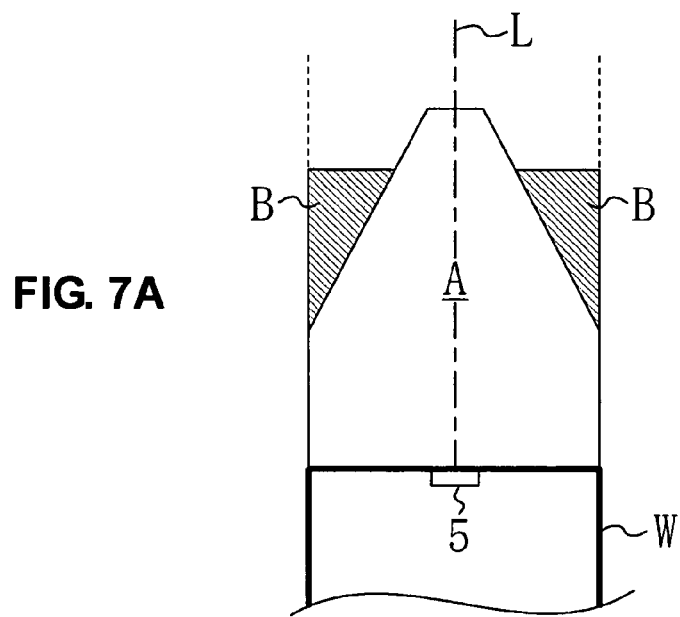
FIG. 7A is an image showing an area for the axis-change detection in a case where a radar axis is normal.
Figure 7B:
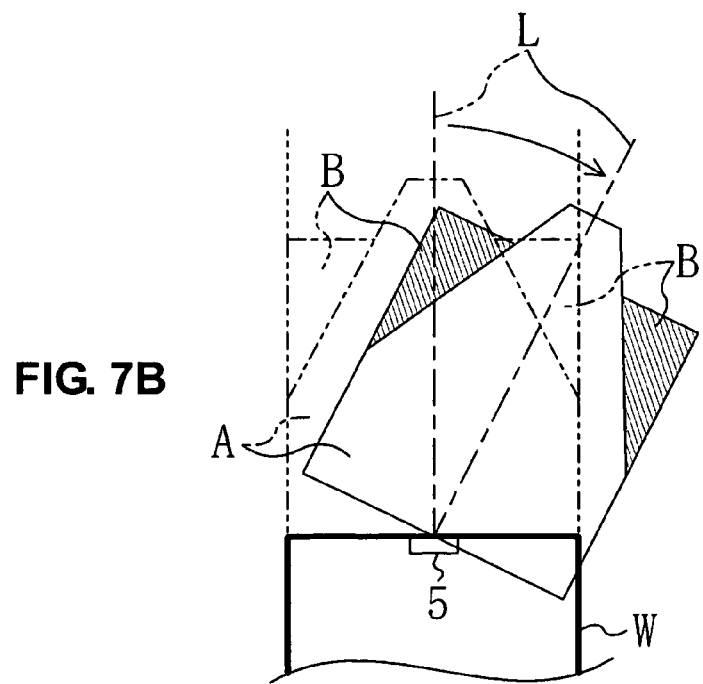
FIG. 7B is an image showing an area for the axis-change detection in a case where there exists a change of the radar axis.

Herein, the detection frequency determining portion 43 detects the detection frequency of the obstacle, namely how many times the obstacle is detected within detecting areas B, B for detecting the radar axis change shown in FIG. 7A, which is different from the detecting area A for the PCS control (see FIG. 5). These detecting areas B, B are located outside the pointed portion of the detecting area A for the PCS control and have substantially a triangular shape. Each front end of these areas B, B is limited by a distance where the vehicle W can reach in a specified time, and both outside ends of these are limited so as to have substantially the same width as the vehicle width. Thus, the areas B, B are relatively near the vehicle W and located inside the vehicle width. Accordingly, since any obstacle in these areas B, B may be avoidable from hitting with a proper operation by the passenger due to the outside location from the area A, it can be said that the possibility of obstacles exiting in these area B, B may be rather low as long as the millimeter-wave radar 5 operates normally and the vehicle W is operated safely because the areas are within the vehicle width. Namely, it can be said that the detection of obstacles in these areas may not occur so often. In the meantime, in a case where there exists a change of a radar axis L as shown in FIG. 7B, the above areas B, B may come to the area where the guide rails or other vehicle traveling in the opposite traveling lane would be detected often as the obstacle by the radar 5 with the changed radar axis. Namely, one side of the detecting areas B, B would project outward beyond the vehicle width due to the change of the radar axis L of the radar 5. As a result, the above guide rails or other vehicles would be detected as the obstacle improperly.

Herein, the object of the obstacle to be detected in the above detecting areas for detecting radar axis change B, B is an object in a stationary state and another vehicle traveling in the opposite lane. The object in the stationary state and another vehicle traveling in the opposite lane may be detected more easily as the obstacle when there exists the change of the radar axis of the radar 5, compared to when there exists no change of the radar axis. Accordingly, by setting the obstacle to be detected to the object in the stationary state and another vehicle traveling in the opposite lane, a difference in the detection frequency according to the existence of the change or no change of the radar axis of the radar 5 comes to appear clearly. Thereby, the detection accuracy of the change of the radar axis can be improved. Herein, the determination as to whether the detected object is the stationary object or the vehicle traveling in the opposite lane can be made according to the relative speed between the vehicle W and the object.

Figures 8A, 8B:
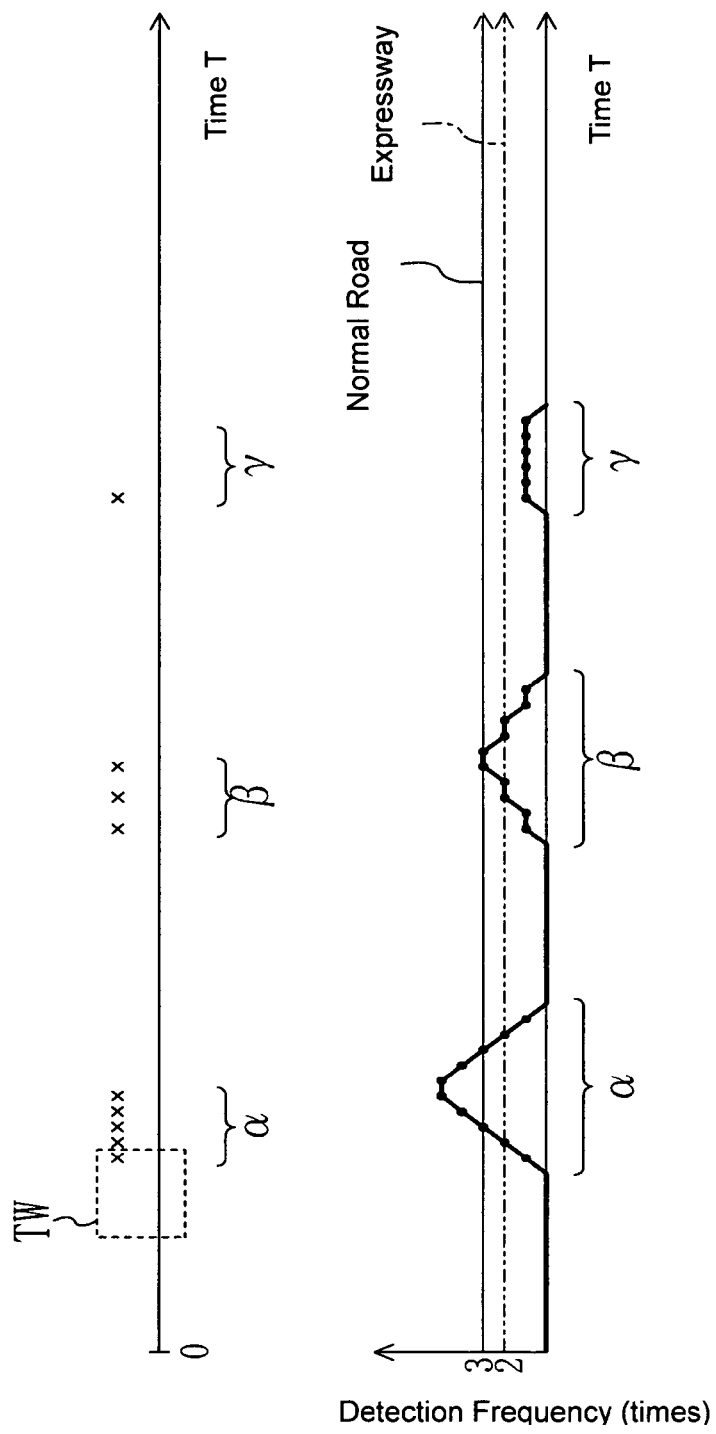
FIG. 8A is a graph showing an exemplified detection results of the obstacle.
FIG. 8B is a graph showing an exemplified detection frequency within a specified period of time.

The frequency detection of the obstacle by the detection frequency determining portion 43 will be described more specifically. The detection frequency determining portion 43 stores the time when the obstacle is detected in the detecting areas B, B in RAM (Random Access Memory) 44 as shown in FIG. 8A (x marks in the figure). Then, as a time window TM with a specified time width (for example, 12 seconds) is moved every a specified interval time, the frequency of the detection of the obstacle in this time window is counted. Thereby, the detection frequency of the obstacle at respective times is counted as shown in FIG. 8B. For example, in the case where the obstacle detected is the one with a relatively large scale such as the guide rail, the detection may appear continuously as shown with a reference character α in FIG. 8A, and the detection frequency in the specified period of time shows a graph denoted by α in FIG. 8B. Meanwhile, in the case where the obstacle detected is the vehicle traveling in the opposite lane, the detection of plural vehicles may appear intermittently as shown with a reference character β in FIG. 8A, and the detection frequency in the specified period of time shows a graph denoted by β in FIG. 8B. Herein, even though the radar axis of the millimeter-wave radar 5 is normal, in a case where the vehicle W travels too close to the guide rails or the vehicle's head is swung accidentally changed in a yaw direction due to a road face condition, the detection of such objects may be also detected accidentally. In this case, the obstacle diction occurs singly as shown with a reference character γ in FIG. 8A, and the detection frequency in the specified period of time shows a graph denoted by γ in FIG. 8B.

Then, the detection frequency determining portion 43 determines whether the above detection frequency exceeds the first frequency (for example, three times in case of traveling on the normal road (shown by a solid line in the figure); two times in case of traveling on the expressway) or not. Herein, in the case where the guide rails (see α in FIG. 8B) or the vehicle traveling in the opposite lane (β in FIG. 8A) are detected, the detection is conducted in such a manner that the detection frequency exceeds the first frequency. Meanwhile, in the case where the obstacle is detected singly (γ in FIG. 8B), the detection is not conducted in such a manner that the detection frequency exceeds the first frequency. When it is determined that the detection frequency exceeds the first frequency, the control sequence waits for the detection frequency becoming zero once (step S4). Then, the excessive frequency is counted up by one time (step S5). This excessive frequency is stored in the RAM 44. Herein, this excessive frequency is reset once IG is turned off.

Through the steps S1-S5, the determination as to whether the continuous or intermittent detection of the obstacle, which is not accidental one, exceeds the first frequency or not is made, and the excessive frequency is counted up.

Then, in step S6, the traveling road determining portion 42 determines again whether the traveling road is the expressway or the normal road.

In the case where the vehicle W travels on the expressway, it is determined whether the counted-up excessive frequency stored in the RAM 44 exceeds the second frequency for the expressway (for example, 2 times) or not (step S7). Meanwhile, in the case where the vehicle W travels on the normal road, it is determined whether the counted-up excessive frequency stored in the RAM 44 exceeds the second frequency for the normal road (for example, 3 times) or not (step S8).

Then, in the steps S7, S8, when the counted-up excessive frequency exceeds the second frequency, the warning area 13c of the indication portion 13 indicates a warning sign (e.g., "E1") and the warning buzzer 15 makes the buzzer sound (e.g., one-time beep), thereby warming the passenger of the existence of the change of the radar axis of the millimeter-wave radar 5 (step S9). And, the control prohibiting portion 47 prohibits the warning with the bodily feeling, namely the PCS control (step S10).

Namely, only the determination that the detection frequencies in the steps S2, S3 reach the first frequency may be not enough to predict that there exists the change of the radar axis of the millimeter-wave radar 5. Accordingly, when the frequency of this determination exceeds the second frequency, the determination that there exists the change of the radar axis of the millimeter-wave radar 5 is made eventually though the steps S6-S10. Herein, the warning is conducted to encourage the passenger to fix the radar 5, and the PCS control is stop so that the unnecessary warning with the bodily feeling with the brake device 8 and seatbelt device 9 can be prevented.

When the change of the radar axis is determined in the steps S7, S8 (YES), the frequency of this detection of the radar axis change (hereinafter, referred to as an axis-change detection frequency) is counted up by one time (step S11). This axis-change detection frequency is stored in EEPROM (Electronically Erasable and Programmable Read Only Memory) 46. Herein, this frequency stored in the EEPROM 46 is not reset even if the IG is turned off, but reset by initializing data at a service factory or the like.

Then, it is determined whether the axis-change detection frequency stored in the EEPROM 46 exceeds a third frequency (for example, 50 times) or not in step S12.

When the axis-change detection frequency is less than the third frequency, an IG off operation is set to a condition for a resumption of the PCS control (step S13). Namely, until the axis-change detection frequency exceeds the third frequency, the passenger is encouraged to fix the millimeter-wave radar 5 (step S9). However, the PCS control can be resumed according to the passenger's will without fixing the radar 5. Meanwhile, when the axis-change detection frequency exceeds the third frequency, it can be determined that there surely exists the change of the radar axis. Accordingly, the fixing of the radar 5 at the service factory or the like and the initializing of the data in the EEPROM 46 are set to the condition for the resumption of the PCS control (step S14). Herein, when the axis-change detection frequency exceeds the third frequency, the warning area 13c of the indication portion 13 indicates a warning sign (e.g., "E2"), thereby warming the passenger of the necessity of fixing the radar at the service factory or the like for the resumption of the PCS control.

Accordingly, according to the present embodiment, the determination as to whether there exists the radar axis change of the millimeter-wave radar 5 or not can be made by checking the frequency of the detection of the obstacle. Herein, since the accidental detection of the obstacle is properly prevented with the determination as to whether the detection frequency exceeds the first frequency within the specified period of time or not by the detection frequency determining portion 43, the axis change of the radar 5 can be determined properly by considering the continuous or intermittent detection of the obstacle that may be caused by the real axis change of the radar 5. Also, since this axis change determination is made with the plural determination (more than times of the second frequency), an accuracy of the determination can be improved.

Also, since the first frequency and the second frequency are set respectively to 2 times for the traveling on the normal road and 3 times for the traveling on the expressway, the determination accuracy as to whether there are the continuous or intermittent detection of the obstacle or not and the determination accuracy as to where there exists the axis change of the millimeter-wave radar 5 can be improved, properly considering the difference in the detection situation of the obstacle.

Further, since the detection frequency determining portion 43 determines the detection frequency of the obstacle by limiting the detecting area to the detecting areas B, B within the detectable entire area of the millimeter-wave radar 5, the accuracy of the detection of the change of the radar axis of the radar 5 can be improved. Namely, since these areas B, B are the one where the possibility that the obstacle is detected is relatively low when the radar axis is normal, while that possibility is relatively high when there exists the change of the radar axis, if the obstacle is detected frequently in this particular area B, B, there is a high likelihood that there exists the change of the radar axis. Accordingly, by limiting the detecting area to these areas B, B, the accuracy of the detection of the change of the radar axis can be improved.

Then, when the radar axis change of the millimeter-wave radar is detected, the passenger is warned of the change with the indication portion 13 and the warning buzzer 15, and the warning with the bodily feeling by the brake device 8 and the seatbelt device 9 are prohibited. Thereby, the passenger can be prevented from having uncomfortable feelings that may be caused by the unnecessary warning with the bodily feeling.

Also, since the radar axis change is detected by checking the detection frequency of the obstacle, it may not be necessary to provide any sensor additionally to detect the radar axis change, thereby keeping costs down.

Further, since the obstacle detecting control device A resumes the PCS control with the IG turned off when the detection frequency of the radar axis change is less than the third frequency, the millimeter-wave radar 5 can be kept in operation as long as the detection degree of the radar axis change of the radar 5 is within an allowable range. However, since the resumption of the PCS control is prohibited by the IG turned off when the detection frequency of the radar axis change exceeds the third frequency and that resumption is allowed by the initialization of the data in the EEPROM 46, the passenger can be properly encouraged to fix the radar 5 by prohibiting the resumption of the PCS control when it can be determined that there surely exists the change of the radar axis.

Herein, any other modifications of the above-described embodiment can be applied. Although the brake device 8 and seatbelt pre-tensioner 90 are applied as the operational device that is controlled by the operation control portion 48 according to the detection results of the obstacle in the above-described embodiment, either one of those devises may be applied.

Also, although the above-described first frequency and second frequency for determination are set to 2 times and 3 times, respectively, any other frequencies can be applied instead of 2 and 3 times. Namely, any other frequency may be applied as the first frequency instead of 2 times as long as that can consider the continuous and intermittent detection of the obstacle, not considering the accidental detection of the obstacle. And, any other frequency may be applied as the second frequency as long as that can determine the radar axis change of the millimeter-wave radar 5. Although the first and second frequency are changed according to the kind of traveling road, namely the normal road or the expressway, either one of the frequencies may be changed or both frequencies may be unchanged.

Likewise, the third frequency may be set to any other frequency than 50 times as long as that can properly prohibit the resumption of the PCS control without fixing the radar.

Further, although the traveling road determining portion 42 determines the normal road or the expressway according to the traveling speed of the vehicle W, this road determination may be made according to information from a navigation system or an ETC receiver.

Further, a shape of the detecting area for determining axis change B, B is not limited to the triangular shape shown in FIG. 7 and may have any other shape. It is preferable that this area B be set to the one where the possibility that the obstacle is detected is relatively low when the radar axis is normal, while that possibility is relatively high when there exists the change of the radar axis.

Although the obstacle detecting control device A is configured to control the traveling control, it should not be limited to this.

The present invention is useful to the obstacle detecting control device that controls the operational device, such as the brake device, according to the detection results of the obstacle in front of the traveling vehicle by the obstacle detecting device such as the radar.

What is claimed is:

1. An obstacle detecting control device of a vehicle, which is installed in a vehicle body and includes an obstacle detecting device to detect an obstacle in front of the vehicle and an operation control device to control an operational device of the vehicle according to detection results of the obstacle by the obstacle detecting device, the obstacle detecting control device comprising:

a detection frequency determining device for predicting occurrence of an abnormality of the obstacle detecting device by preventing an accidental detection of the obstacle, which is operative to determine that a frequency of detection of the obstacle by the obstacle detecting device within a specified period of time exceeds a specified first frequency;

an excessive frequency determining device for confirming the occurrence of the abnormality of the obstacle detecting device, which is operative to determine that a frequency of said determination by the detection frequency determining device exceeds a specified second frequency; and a warning device to warn a passenger of the abnormality of the obstacle detecting device when said determination by the excessive frequency determining device is made.

2. The obstacle detecting control device of a vehicle of claim 1, wherein the obstacle detecting device is a radar which is attached to the vehicle body in such a manner that a radar axis is directed toward a specified direction, and the abnormality of the obstacle detecting device is such that there exists a change of the radar axis of the radar.

3. The obstacle detecting control device of a vehicle of claim 2, wherein there is further provided a traveling road determining device to determine whether a traveling road is an expressway or a normal road, and at least one of said specified first frequency and specified second frequency is adjustable so that it has a greater frequency value when it is determined by the traveling road determining device that the traveling road is the normal road, compared to that when it is determined that the traveling road is the expressway.

4. The obstacle detecting control device of a vehicle of claim 2, wherein said frequency of the detection of the obstacle in determining the excess over the specified first frequency by the detection frequency determining device is configured to be a frequency of the detection in which the obstacle is detected within a specified detecting area of the obstacle detecting device.

5. The obstacle detecting control device of a vehicle of claim 2, wherein said obstacle to be detected in determining the excess over the specified first frequency by the detection frequency determining device includes an object in a stationary state and another vehicle traveling in an opposite lane, which are located in front of the traveling vehicle.

6. The obstacle detecting control device of a vehicle of claim 1, wherein there is further provided a control prohibiting device to prohibit the control of the operational device by the operation control device when said determination by the excessive frequency determining device is made.

7. The obstacle detecting control device of a vehicle of claim 1, wherein the operational device is a brake device.

8. The obstacle detecting control device of a vehicle of claim 1, wherein the operational device is a seatbelt pretensioner to pull in a seatbelt for restraining the passenger with a specified tension.

* * * * *